(12) United States Patent
Nowak, Jr.

(10) Patent No.: US 6,935,824 B2
(45) Date of Patent: Aug. 30, 2005

(54) TAMPER RESISTANT SCREW

(76) Inventor: Edmund A. Nowak, Jr., 7742 Elmgrove Dr., Elmwood Park, IL (US) 60707

( * ) Notice: Subject to any disclaimer, the term of this patent is extended or adjusted under 35 U.S.C. 154(b) by 20 days.

(21) Appl. No.: 10/425,752

(22) Filed: Apr. 29, 2003

(65) Prior Publication Data

US 2004/0218993 A1 Nov. 4, 2004

(51) Int. Cl.[7] .............................................. F16B 23/00
(52) U.S. Cl. ....................... 411/402; 411/910; 411/403; 81/451; 81/121.1
(58) Field of Search ................................ 411/402, 403, 411/407, 410, 910; 81/436, 451, 121.1

(56) References Cited

U.S. PATENT DOCUMENTS

| | | | |
|---|---|---|---|
| 135,388 A | * | 1/1873 | Tucker ........................ 411/402 |
| 374,701 A | * | 12/1887 | Quinby ........................ 411/402 |
| 2,169,460 A | * | 8/1939 | Broughton .................. 411/403 |
| 2,338,023 A | | 12/1943 | Bugg |
| 3,449,988 A | | 6/1969 | Gallo, Sr. |
| 3,695,321 A | * | 10/1972 | Garehime, Jr. ............... 81/448 |
| 3,888,144 A | | 6/1975 | Parsons |
| 4,018,111 A | | 4/1977 | Goldhaber |
| 4,128,038 A | | 12/1978 | Urwin |
| 4,258,596 A | | 3/1981 | Bisbing et al. |
| 4,311,071 A | * | 1/1982 | Bassell ......................... 81/436 |
| 4,325,153 A | | 4/1982 | Finnegan |
| 4,380,942 A | | 4/1983 | Fenton |
| 4,425,066 A | * | 1/1984 | Kollmann ................. 411/387.4 |
| 4,478,115 A | | 10/1984 | Ellis |
| 4,528,874 A | * | 7/1985 | Dunn ......................... 81/57.37 |
| 5,302,068 A | | 4/1994 | Janusz et al. |
| 5,697,743 A | * | 12/1997 | Parker ............................. 411/5 |
| 5,713,705 A | * | 2/1998 | Grunbichler ................... 411/5 |

* cited by examiner

Primary Examiner—William L. Miller
(74) Attorney, Agent, or Firm—Welsh & Katz, Ltd.

(57) ABSTRACT

An improved tamper resistant screw and driver tool. In one embodiment, the present invention provides a tamper resistant screw and screw driver tool. The screw head features a unique tamper resistant design. The screw cannot be turned successfully with standard screw drivers, pliers, vice grips, wrenches or socket type wrenches. It is driven by a specially designed driver tool which, upon application, is centered on the screw head to avoid side-to-side slippage and is driven by angle-to-angle contact. The angle and depth of the drive tool can be changed to maximize the amount of torque delivered to the screw. This design not only discourages an individual from attempting to gain access to a restricted area, it will clearly indicate if the screw head has been tampered with by means of score marks and gouges.

18 Claims, 4 Drawing Sheets

COUNTER SINK
I TO J DIA.

TAMPER RESISTANT SCREW

FIELD OF THE INVENTION

The present invention relates to tamper resistant fasteners, and more particularly to tamper resistant fasteners that provide for a screw that can only be turned with a specific non-standard driver tool and provide for enhanced tamper detection.

BACKGROUND OF THE INVENTION

Tamper resistant fasteners of various types are well known in the art. Such devices are typically used in applications where tampering must be prevented. Numerous tamper resistant fasteners and tools for turning such fasteners have been disclosed in the prior art. These devices are designed to resist turning except when a specific driver designed for that purpose is utilized. Such fasteners having these special characteristics have numerous applications to prevent tampering or malicious removal of the fastener. The design of such fasteners focuses to make it extremely difficult for unauthorized persons to gain access to a particular piece of equipment or access to within a building wherein such fasteners are being used. Further, tamper resistant fasteners are also used to prevent individuals from tampering with equipment such as airplanes, automobiles, public transportation, etc. The tamper resistant fastener and the driver tool specifically designed for operating the fastener must be of such a design so that it is relatively simple for authorized persons to obtain access to the particular piece of equipment or area by the simple and easy removal of the fastener.

Tamper resistant fasteners having holes or sockets are known in the art as specialty head fasteners. Such fasteners currently available in the prior art present problems during operation. When torque is applied to a conventional fastener head having two sockets, it is common for the driving tool to tilt in one direction as torque is being applied. The tilting interferes greatly with the installation and removal of such fastener, since such movement diverts much energy from the driving tool as attempts are made to keep the tool in a straight position. Other types of tamper resistant fasteners, which do not create tilting problems, include those containing a one-way head and those having a break-a-way head. The former type can be driven in only one direction. The latter type is driven by conventional tools but can be used only once because part of the head breaks away from the fastener after use. Another, disadvantage with existing tamper resistant fasteners is that they can be removed with conventional off-the-shelf tools. Further, some existing tamper resistant fasteners do not provide for tamper detection.

The present invention overcomes these and other problems inherent in existing tamper resistant fasteners. The present invention provides a tamper resistant screw that can only be turned with a specific non-standard driver.

The principal object of the present invention is to provide an improved tamper resistant screw that can only be turned with a specific non-standard driver.

Another object of the present invention is to provide a novel tamper resistant screw that provides for tamper detection.

Still another object of the present invention is to provide a novel driver tool that can turn the tamper resistant screw.

A further object of the present invention is to provide a novel tamper resistant screw and driver tool which are simple in design and inexpensive to construct, and are durable and rugged in structure.

Still further objects and advantages will become apparent from a consideration of the ensuing description and drawings of the invention.

SUMMARY OF THE INVENTION

These and other objects are achieved by a tamper resistant screw and driver tool of the present invention. In one embodiment, the present invention provides a tamper resistant screw and screw driving tool. The screw head features a unique tamper resistant design. The screw cannot be turned successfully with standard screw drivers, pliers, vice grips, wrenches or socket type wrenches. It is driven by a specially designed driver tool which, upon application, is centered on the screw head to avoid side-to-side slippage and is driven by angle-to-angle contact. The angle and depth of the drive tool can be changed to maximize the amount of torque delivered to the screw. This design not only discourages an individual from attempting to gain access to a restricted area, it will clearly indicate if the screw head has been tampered with by means of score marks and gouges.

DETAILED DESCRIPTION OF THE INVENTION

Figure 1:
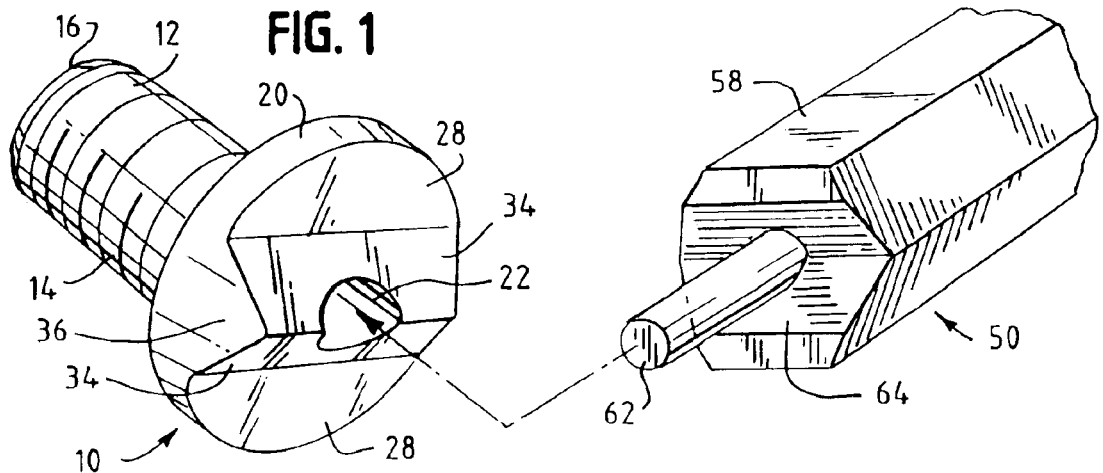
FIG. 1 is a perspective view of one embodiment of the tamper resistant screw and driver tool of the present invention.
Figure 2:
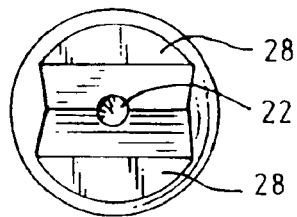
FIG. 2 is a top view of the tamper resistant screw of FIG. 1.
Figure 3:
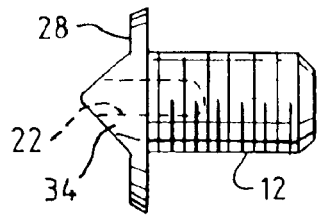
FIG. 3 is a side view of the tamper resistant screw of FIG. 1.

FIG. 1 is a perspective view of one embodiment of the tamper resistant screw 10 and driver tool 50 constructed in accordance with the present invention. As shown in FIG. 1, tamper resistant screw 10 comprises a shank 12 having threads 14 and a shank end 16. Attached to the shank 12 opposite the shank end 16 is a screw head 20 having a cavity 22, lips 28 and slanted outer side walls 34 substantially as shown in FIGS. 1, 2, 3 and 4.

Figure 4:
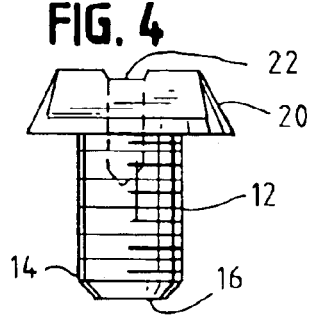
FIG. 4 is a front view of the tamper resistant screw of FIG. 1.
Figure 4A:
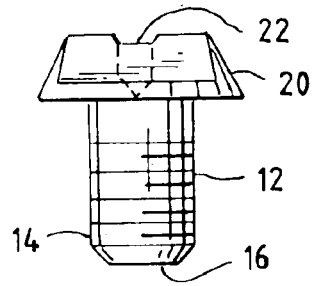
FIG. 4(a) is a front view of an alternate embodiment of the tamper resistant screw of FIG. 1.

In one embodiment, shank 12 can be any length and or diameter necessary for a particular application. Also, threads 14 may be any type of thread or any numbers of thread per inch for the specific requirements of a certain application. As shown in FIGS. 4 and 4(a), threads 14 may cover the entire length of shaft 12 or may cover only a portion of shaft 12. Further, threads 14 may be oriented on shaft 12 so that screw 10 is fastened by turning in a clockwise rotation or threads 14 may be oriented so that screw 12 is fastened by turning in a counter clockwise rotation.

The screw head 20 is formed with a generally circular shaped top surface having 2 outer side walls 34 that generally form a substantially triangular shaped portion 36 extending from the head 20 and defining two lips 28 as shown in FIG. 1. A cavity 22 is formed substantially through the center of the triangular shaped portion 36 and screw head 20 and cavity 22 extends into shank 12. In an alternate embodiment, cavity 22 may not extend into shank 12.

Figure 5:
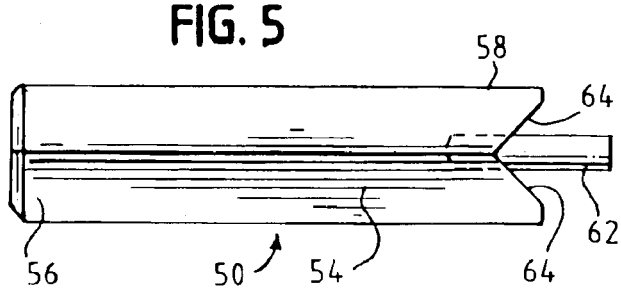
FIG. 5 is a side view of the driver tool of FIG. 1.
Figure 6:
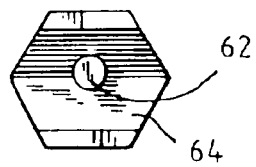
FIG. 6 is an top view of the driver tool of FIG. 1.
Figure 10:
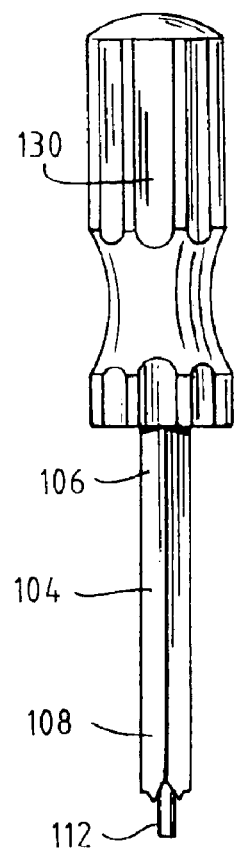
FIG. 10 is a front view of the driver tool of FIG. 9 shown inserted into a handle.

As shown in FIGS. 1, 5, 6, tamper resistant screw driver 50 comprises a shaft 54, a driver end 56 and a driver end 58. At driver end 58, driver 50 includes a coupling protrusion 62 and inner sidewalls 64. In other embodiments, a handle may be connected to driver 50 as shown in FIG. 10.

Tamper resistant screw driver 50 includes a coupling protrusion 62 that is disposed on tool end 58 substantially centered between inner sidewalls 64. In one embodiment, protrusion 62 may extend past sidewalls 64. In yet another embodiment, protrusion 62 may not extend past sidewalls 64. Protrusion 62 and shaft 54 may be comprised of a single piece of material or, in another embodiment, protrusion 62 and shaft 54 may be comprised of two separate pieces of material and joined together to form an integral piece.

Tamper resistant screw 10 can be manufactured from any grade of steel, stainless steel, aluminum, brass, copper, plastic or fiber. In one embodiment, steel screws 10 may be hardened to avoid excessive wear. In yet another embodiment, steel screws 10 can be used in their annealed state.

In one embodiment, the screw driver tool 50 may be manufactured from a medium to high carbon steel which may also be heat treated to minimize wear. In yet other embodiments, the driver tool may be plated to minimize corrosion.

Figure 11:
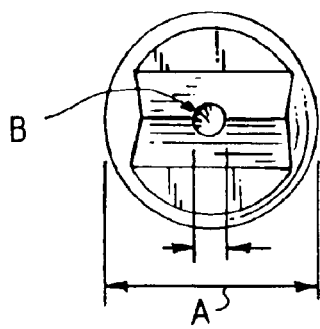
FIG. 11 is a top view of one embodiment of the tamper resistant screw FIG. 1 with markings to identify dimensions and angles.
Figure 12:
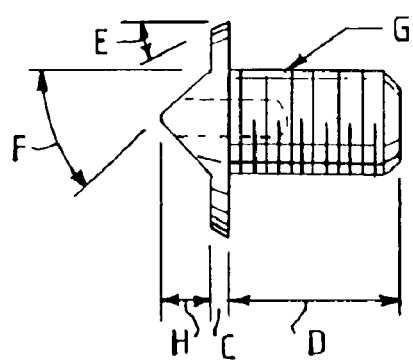
FIG. 12 is a side view of one embodiment of FIG. 1 with markings to identify dimensions and angles.
Figure 13:
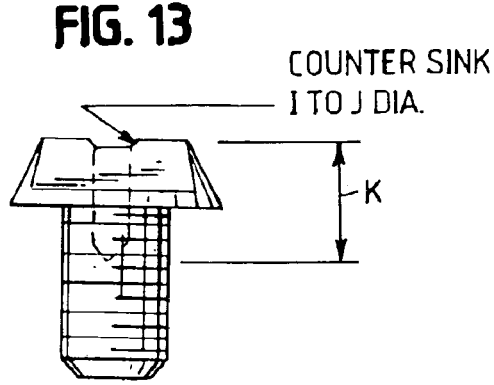
FIG. 13 is a front view of one embodiment of FIG. 1 with markings to identify dimensions and angles.

In one embodiment table A indicates the dimensions and angles that define tamper resistant screw 10. Dimensions and angles in table a correlate to FIGS. 11, 12 and 13. In yet other embodiments, tamper resistant screw 10 is not limited to the dimensions in table A. A variety of different dimensions and angles may be used to manufacture tamper resistant screw 10. The manufacturing process may consist of machining the dimension G screw thread size, the dimension E degree taper and the dimension B diameter hole, the dimension I degree angle on a CNC horizontal machining center. The dimension F degree angle on a vertical machining center. Then, machine item B on a vertical machining center. The screw may then be heat treated if required for the particular application.

TABLE "A"

| | |
|---|---|
| A | 7/32 MIN |
| B | .068–.070 MIN |
| C | .035 |
| D | 1/8 MIN |
| E | 20°–30° |
| F | 45° |
| G | ANY SIZE |
| H | .080 |
| I | 120° |
| J | .132 |
| K | BASED ON THREAD SIZE |

Figure 14:
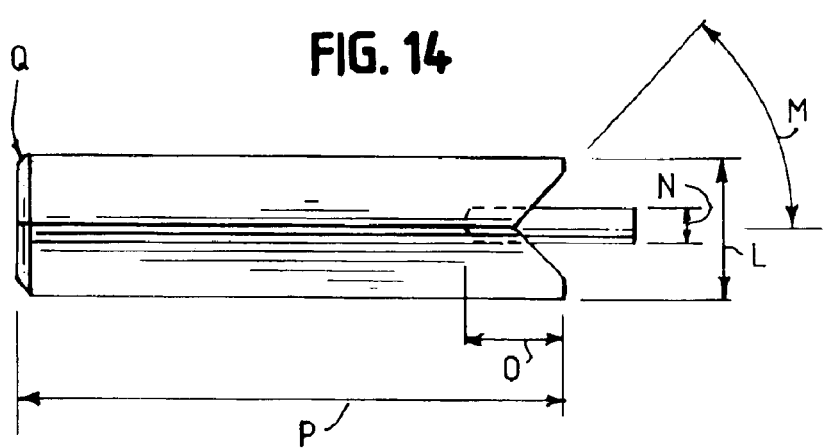
FIG. 14 is a side view of one embodiment of the driver tool of FIG. 1 with markings to identify dimensions and angles.
Figure 15:
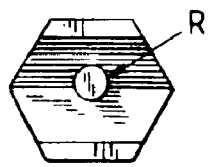
FIG. 15 is a top view of one embodiment of the driver tool of FIG. 1 with markings to identify dimensions and angles.

In one embodiment, table B indicates the dimensions and angles that define tamper resistant screw driver 50. Dimensions and angles in table b correlate to FIGS. 14 and 15. In yet other embodiments, tamper resistant screw driver is not limited to the dimensions and angles shown in table B. A variety of different dimensions and angles may be used to manufacture driver 50.

TABLE B

| | |
|---|---|
| L | 5/32 MIN |
| M | 45° |
| N | 1/16 × 5/16 LONG SPRING PIN |
| O | .188 MIN |
| P | ANY LENGTH |
| Q | .030 × 45° |
| R | .061–.065 |

For one embodiment of the invention, the manufacturing process may consist of machining dimension R diameter and the dimension Q chamber on a horizontal machining center. Machine angle M on a vertical machining member. Heat treat the steel for certain applications.

Figure 7:
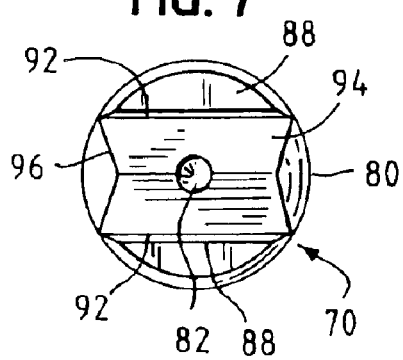
FIG. 7 is a top view of an alternate embodiment of the tamper resistant screw of the present invention.
Figure 8:
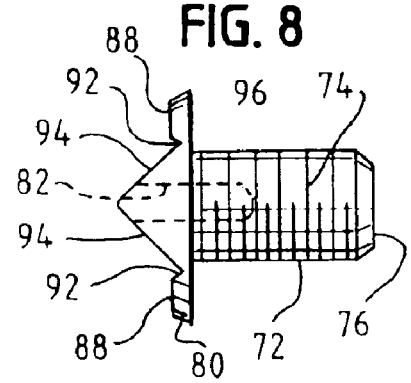
FIG. 8 is a side view of the tamper resistant screw of FIG. 7.

FIGS. 7 and 8 show another embodiment of the tamper resistant screw 70 constructed in accordance with the present invention. As shown in FIGS. 7 and 8, tamper resistant screw 70 comprises a shank 72 having threads 74 and a shank end 76. Attached to the shank 72 opposite the shank end 76 is a screw head 80 having a cavity 82, lip 88, recesses 92 and slanted outer side walls 94 substantially as shown in FIGS. 7 and 8.

In one embodiment, shank 72 can be any length and or diameter necessary for a particular application. Also, threads 74 may be any type of thread or any numbers of thread per inch for the specific requirements of a certain application. Threads 74 may cover the entire length of shaft 72 or may cover only a portion of shaft 72. Further, threads 74 may be oriented on shaft 72 so that screw 70 is fastened by turning a clockwise rotation or threads 74 may be oriented so that screw 72 is fastened by turning in a counter clockwise rotation.

The screw head 80 is formed with a generally circular shaped top surface having two outer side walls 94 that generally form a substantially triangular shaped portion 96 extending from the head 80 and defining two lips 88. Recesses 92 are defined on each side of triangular shaped portion 96 substantially as shown in FIGS. 7 and 8. A cavity 82 is formed substantially through the center of the triangular shaped portion 96 and screw head 80 and cavity 82 extends into shank 72. In an alternate embodiment, cavity 82 may not extend into shank 72.

Figure 9:
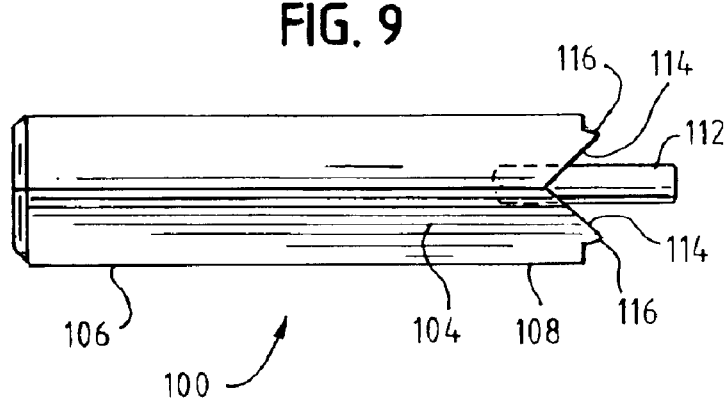
FIG. 9 is a side view of an alternate embodiment of the driver tool of the present invention.

As shown in FIGS. 9 and 10, tamper resistant screw driver 100 comprises a shaft 104, a driver end 106 and a driver end 108. At driver end 108, driver 100 includes a coupling protrusion 112 and inner sidewalls 114. Inner side walls 114 form protrusion 116 which mate with recesses 92. In other embodiments, a handle 130 may be connected to driver 100 as shown in FIG. 10.

Tamper resistant screw driver 100 includes a coupling protrusion 112 that is disposed on tool end 108 substantially centered between inner sidewalls 114. In one embodiment, protrusion 112 may extend past sidewalls 114. In yet another embodiment, protrusion 112 may not extend past sidewalls 114. Protrusion 112 and shaft 104 may be comprised of a single piece of material or, in another embodiment, protrusion 112 and shaft 104 may be comprised of two separate pieces of material and joined together to form an integral piece.

Tamper resistant screw 70 can be manufactured from any grade of steel, stainless steel, aluminum, brass, copper, plastic or fiber. In one embodiment, steel screws 70 may be hardened to avoid excessive wear. In yet another embodiment, steel screws 70 can be used in their annealed state.

Figure 16:
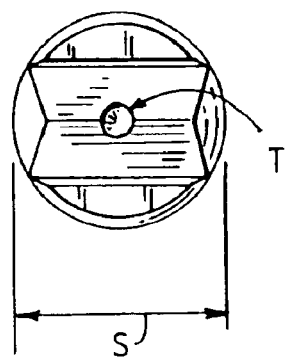
FIG. 16 is a top view of one embodiment of the tamper resistant screw of FIG. 16 with markings to identify dimensions and angles.
Figure 17:
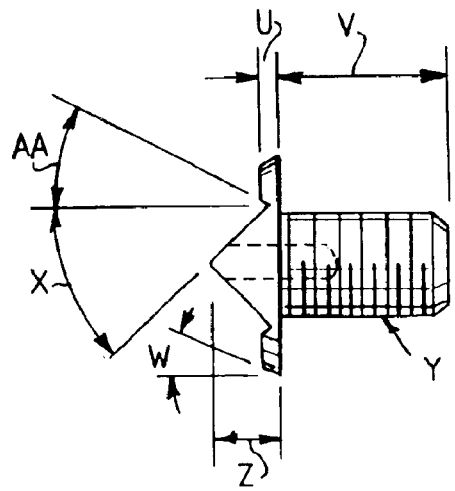
FIG. 17 is a front view of one embodiment of the tamper resistant screw of FIG. 16 with markings to identify dimensions and angles.
Figure 18:
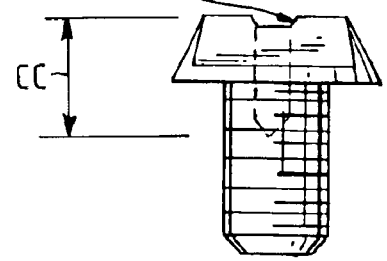
FIG. 18 is a front view of one embodiment of the tamper resistant screw of FIG. 16 with markings to identify dimensions and angles.

In one embodiment, table C indicates the dimensions and angles that define tamper resistant screw 70. Dimensions and angles in table c correlate to FIGS. 16, 17 and 18. In yet other embodiments, tamper resistant screw driver is not limited to the dimensions in table C. A variety of different dimensions and angles may be used to manufacture screw 70.

TABLE C

| | |
|---|---|
| S | 7/32 MIN |
| T | .068–070 MIN |
| U | .035 |
| V | 1/8 MIN |
| W | 30° |
| X | 30° |
| Y | ANY SIZE |
| Z | .080 MIN |
| AA | 120° INCL. |
| BB | .031 |
| CC | BASED ON THREAD SIZE |

Figure 19:
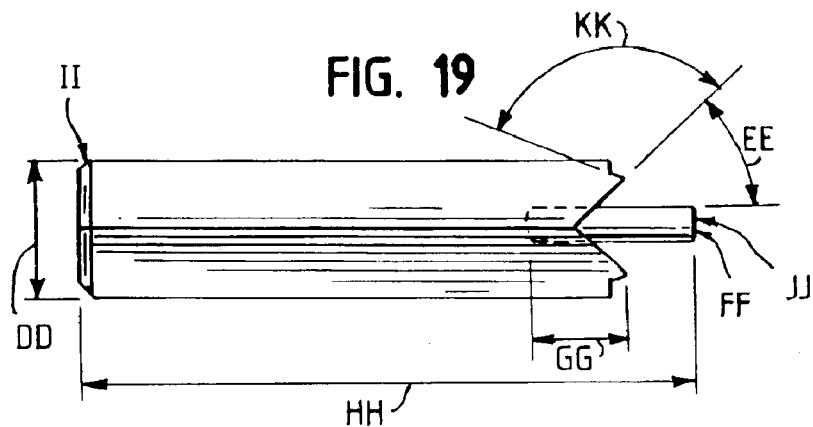
FIG. 19 is a side view of one embodiment of the driver tool of FIG. 9 with markings to identify dimensions and angles.

In one embodiment, the screw driver tool 100 may be manufactured from a medium to high carbon steel which may also be heat treated to minimize wear. In yet other embodiments, the driver tool may be plated to minimize corrosion. Table D indicates the dimensions and angles that define one embodiment of the driver 100. Dimensions and angles in table d correlate to FIG. 19. In yet other embodiments, driver 100 may be manufactured in a variety of different dimensions angles.

TABLE D

| | |
|---|---|
| DD | 5/32 MIN |
| EE | 30° |
| FF | 1/16 × 5/16 LONG PIN |
| GG | .188 MIN |
| HH | 1 1/8 " MIN |
| II | .030 × 45° |
| JJ | .061–.065 PRIOR TO ASSEMBLY |
| KK | 30° |

During use, one embodiment of the tamper resistant screw head features a unique tamper resistant design that is not commercially available. The screw cannot be turned successfully with a standard screw driver, pliers, vice grips, wrenches or socket type wrenches. It must be driven by driver tool 50 which upon application, is centered on screw head 20 to avoid side-to-side slippage and is driven by angle to angle contact.

To drive screw 10, coupling protrusion 62 is centered on cavity 22 and protrusion 62 is inserted into cavity 22. After protrusion 62 is fully entered into cavity 22, inner sidewalls 64 contact outer sidewalls 34 of screw 10. Driver 50 is then turned in a clockwise or counter-clockwise rotation (depending upon the orientation of threads 14). As angle-to-angle contact is experienced when inner sidewalls 64 contact outside walls 34 and protrusion 62 assists to maintain this contact in cooperation with cavity 22, torque is applied to screw head 20. When driver 50 is rotated, screw 10 turns in the same direction as driver 50.

If alternate embodiment screw 70 and driver tool 100 are used, protrusions 116 will align and firmly mate with recesses 92. The screw 10 may also be removed in a similar fashion by turning driver 50 in the opposite direction. The angle of the drive can be changed within limits to maximize the amount of torque delivered to screw 10. If an unauthorized individual attempts to gain access to a restricted area by attempting to loosen screw 10, tamper resistant screw 10 will clearly indicate that the screw head 20 has been tampered with by means of score marks and gouges.

Specific embodiments of novel methods and apparatus for construction of novel tamper resistant screws and driver tools according to the present invention have been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention any and all modifications, variations, or equivalents that fall within the true spirit and scope of the basic underlying principles disclosed and claimed herein.

What is claimed is:

1. A tamper resistant screw comprising:
   a shank having threads;
   a screw head disposed on one end of the shank;
   at least two outer side walls forming an elongated triangular shaped projection and disposed on the screw head; and
   the projection having a cavity.

2. The tamper resistant screw of claim 1 wherein the shank has threads along the entire length of the shank.

3. The tamper resistant screw of claim 1 wherein the shank has threads along only a portion of the length of the shank.

4. The tamper resistant screw of claim 1 wherein the cavity and the shank have substantially the same longitudinal centerline.

5. The tamper resistant screw of claim 1 wherein the cavity extends into at least a portion of the shank.

6. The tamper resistant screw of claim 1 wherein the cavity does not extend past the screw head.

7. A method for turning a tamper resistant screw using a tool comprising;
   providing a screw having a shank with threads and a screw head disposed on one end of the shank wherein at least two outer side walls are located on the screw head and form a an elongated triangle shaped projection which has a cavity;
   providing a tool having two inner side walls and a coupling protrusion disposed on one end of the tool where the protrusion is positioned between the inner side walls;

aligning the coupling protrusion with the cavity;

inserting the coupling protrusion into the cavity whereby the inner side walls of the tool contact the outer side walls of the elongated triangles shaped projection; and turning the tool.

8. The tamper resistant screw of claim 7 wherein the shank has threads along the entire length of the shank.

9. The tamper resistant screw of claim 7 wherein the shank has threads along only a portion of the length of the shank.

10. The tamper resistant screw of claim 7 wherein the cavity and the shank have substantially the same longitudinal centerline.

11. The tamper resistant screw of claim 7 wherein the cavity extends into at least a portion of the shank.

12. The tamper resistant screw of claim 7 wherein the cavity does not extend past the screw head.

13. A fastener comprising a head;

a shank having a threaded portion and the head attached to the shank at one end;

the shank aligned along the same longitudinal axis as the head and two outer side walls located on the head and forming a projection on the head; and the projection having a cavity.

14. The tamper resistant screw of claim 13 wherein the shank has threads along the entire length of the shank.

15. The tamper resistant screw of claim 13 wherein the shank has threads along only a portion of the length of the shank.

16. The tamper resistant screw of claim 13 wherein the cavity and the shank have substantially the same longitudinal centerline.

17. The tamper resistant screw of claim 13 wherein the cavity extends into at least a portion of the shank.

18. The tamper resistant screw of claim 13 wherein the cavity does not extend past the screw head.

* * * * *